(12) United States Patent
Grimminger et al.

(10) Patent No.: US 11,821,677 B2
(45) Date of Patent: Nov. 21, 2023

(54) DOMESTIC APPLIANCE COMPRISING A SENSOR FOR DETECTING A DOOR MOVEMENT

(71) Applicant: BSH HAUSGERAETE GMBH, Munich (DE)

(72) Inventors: Jochen Grimminger, Dillingen (DE); Christopher Rodney, Burgau (DE); Hans Peter Werner, Giengen (DE); Daniel Bihr, Kirchheim am Ries (DE)

(73) Assignee: BSH Hausgeraete GmbH, Munich (DE)

( * ) Notice: Subject to any disclaimer, the term of this patent is extended or adjusted under 35 U.S.C. 154(b) by 218 days.

(21) Appl. No.: 16/770,172

(22) PCT Filed: Nov. 21, 2018

(86) PCT No.: PCT/EP2018/082088
§ 371 (c)(1),
(2) Date: Jun. 5, 2020

(87) PCT Pub. No.: WO2019/110305
PCT Pub. Date: Jun. 13, 2019

(65) Prior Publication Data
US 2021/0164721 A1    Jun. 3, 2021

(30) Foreign Application Priority Data
Dec. 5, 2017   (DE) .............................. 102017221868

(51) Int. Cl.
*F25D 23/02*    (2006.01)
*F25D 27/00*    (2006.01)
(Continued)

(52) U.S. Cl.
CPC ......... *F25D 23/028* (2013.01); *F25D 27/005* (2013.01); *G01P 1/07* (2013.01);
(Continued)

(58) Field of Classification Search
CPC ...... F25D 23/028; F25D 23/27; F25D 27/005; F25D 2700/02; G01P 1/07; G01P 15/00; H04N 7/188
See application file for complete search history.

(56) References Cited

U.S. PATENT DOCUMENTS

| | | | |
|---|---|---|---|
| 10,591,348 B1* | 3/2020 | Shi ........................ | A47F 3/0408 |
| 2006/0196198 A1* | 9/2006 | Kim ....................... | A47B 51/00 |
| | | | 62/131 |

(Continued)

FOREIGN PATENT DOCUMENTS

| | | |
|---|---|---|
| CN | 101750510 A | 6/2010 |
| EP | 2636355 A1 | 9/2013 |

(Continued)

*Primary Examiner* — Nelson J Nieves
(74) *Attorney, Agent, or Firm* — Laurence A. Greenberg; Werner H. Stemer; Ralph E. Locher

(57) ABSTRACT

A household appliance includes at least one movable door and at least one sensor for detecting a door movement, particularly a door opening angle of the at least one door. The at least one sensor includes at least one inertial sensor integrated into the at least one door. The household appliance is particularly advantageously a refrigerating device, especially a refrigerator, having a pivoting door.

14 Claims, 1 Drawing Sheet

(51) Int. Cl.
*G01P 1/07* (2006.01)
*G01P 15/00* (2006.01)
*H04N 7/18* (2006.01)

(52) U.S. Cl.
CPC ............. *G01P 15/00* (2013.01); *H04N 7/188* (2013.01); *F25D 2700/02* (2013.01)

(56) References Cited

U.S. PATENT DOCUMENTS

| | | |
|---|---|---|
| 2010/0154540 A1 | 6/2010 | Uemura |
| 2013/0232877 A1 | 9/2013 | Tiekoetter |
| 2014/0293060 A1* | 10/2014 | Ryu ..................... H04N 5/2252 348/159 |
| 2014/0313331 A1 | 10/2014 | Kim |
| 2015/0097691 A1 | 4/2015 | Smith |
| 2016/0123659 A1* | 5/2016 | Kim ..................... G03B 29/00 62/125 |
| 2016/0138860 A1* | 5/2016 | Kang ..................... F25D 29/00 62/130 |
| 2016/0182864 A1 | 6/2016 | Izawa et al. |
| 2016/0182868 A1 | 6/2016 | Izawa et al. |
| 2016/0223250 A1* | 8/2016 | Kang ..................... H04N 7/183 |
| 2017/0089632 A1* | 3/2017 | Kang ..................... G09G 5/003 |
| 2017/0162012 A1* | 6/2017 | Kim ..................... E06B 7/28 |
| 2017/0350643 A1* | 12/2017 | Xia ..................... F25D 23/028 |
| 2018/0062877 A1* | 3/2018 | Iyengar ..................... H04L 12/6418 |
| 2018/0252463 A1* | 9/2018 | Grimminger ......... F25D 23/028 |
| 2018/0259247 A1* | 9/2018 | Werner ................. H04N 5/2253 |
| 2019/0330909 A1* | 10/2019 | Lee ..................... F25D 23/028 |

FOREIGN PATENT DOCUMENTS

| | | |
|---|---|---|
| EP | 2784419 A1 | 10/2014 |
| JP | 2015169412 A | 9/2015 |
| JP | 2015222138 A | 12/2015 |
| WO | 2017052058 A1 | 3/2017 |

* cited by examiner

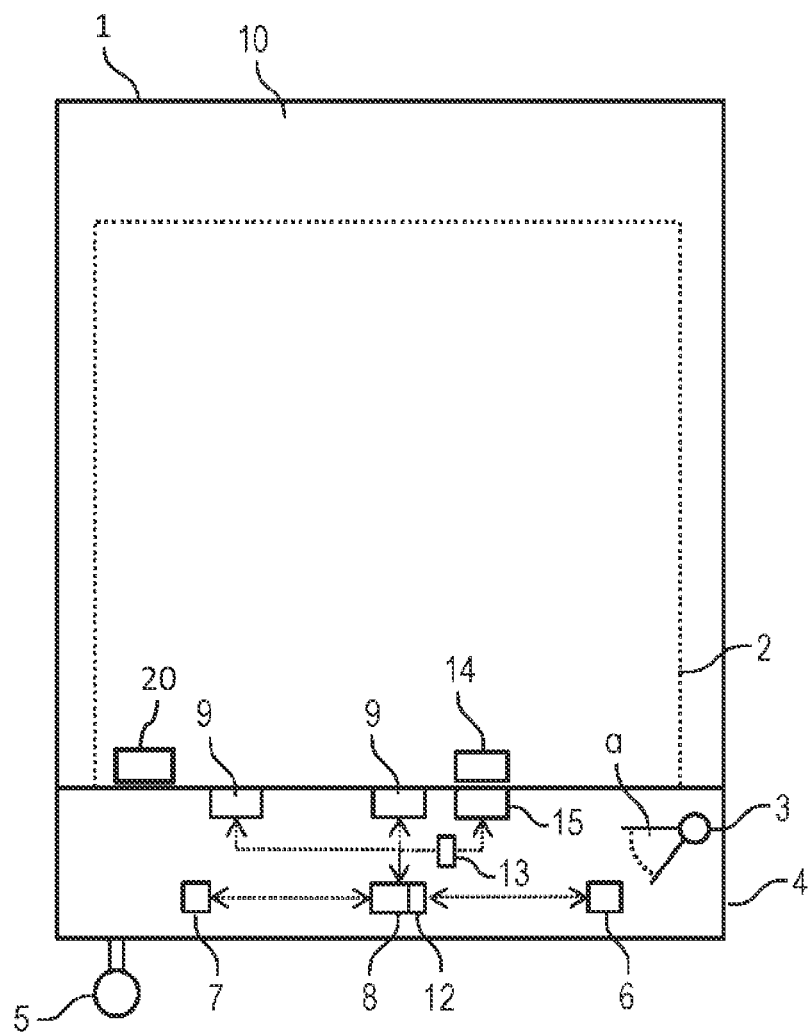

DOMESTIC APPLIANCE COMPRISING A SENSOR FOR DETECTING A DOOR MOVEMENT

BACKGROUND OF THE INVENTION

Field of the Invention

The invention relates to a household appliance having at least one movable door and at least one sensor for detecting a door movement. The invention is advantageously applicable, in particular, to refrigeration appliances, in particular refrigerators, having a pivotable door.

Currently, a door movement is detected by Hall sensors and magnets, one component thereof being located on the door and the other component thereof being located on a fixed part of the household appliance (hereinafter also denoted as the "body"). Thus it is possible to detect when a fixedly predetermined door opening angle (also denoted as the "trigger angle") is reached or exceeded, said door opening angle being determined by the fixedly installed position of the two components relative to one another. A drawback is that it is only possible to fix a new trigger angle by manually re-adjusting the position of the components on the appliance. The option, which is effectively unavailable, of simply re-adjusting the position of the Hall sensor and/or magnet is a drawback, in particular, when the position of the door on the household appliance has been altered as a result of use, for example if the door has dropped.

Deviations from the set trigger angle are disadvantageous, for example, if a camera is installed in a door of a refrigerator, since when the door is open, namely when the trigger angle is reached during an opening movement, said camera starts to record images of a refrigerating zone which is closable by the door. If the trigger angle is not adjusted, the camera is activated at the wrong time so that the ability to evaluate the images recorded thereby is reduced.

US 2014/0293060 A1 discloses a refrigerator. The refrigerator has a main body or a body with a storage compartment, a first door, which is rotatably installed on a first side of the main body in order to open and to close a first portion of the storage space, and a second door, which is rotatably installed on a second side of the main body in order to open and close a second portion of the storage compartment. A first camera may be installed on the first door in order to record an image of an interior of the storage compartment during the rotation of the first door and a second camera may be installed on the second door in order to record an image of the interior of the storage compartment during the rotation of the second door. A controller may combine a plurality of images recorded by the first camera and the second camera into a single corrected image of a region of the storage compartment which extends from the first door to the second door.

US 2014/0313331 A1 discloses a refrigerator and an operating method therefor. The operating method of the refrigerator, which may contain a drawer and a camera, may comprise the identification of the start of a closing process of the drawer, the detection of an internal image of the drawer by using the camera at a time at which the closing process of the drawer is initiated and an external display and/or transmission of the final image.

US 2016/0182864 A1 discloses a camera system with a camera apparatus which serves as an image detection unit; a communication unit which is configured to transmit image information detected by the camera apparatus to an external appliance; and a display which is configured to display image information which is detected by the camera appliance, wherein the display is configured such that it displays at least image information which has been detected by the camera appliance according to prescribed conditions and image information which has been detected according to user instructions.

US 2016/0182868 A1 discloses a camera device for use in a storage apparatus. The camera device is provided with a housing which is configured such that it may be installed in a storage apparatus; with an image recording element which is provided inside the housing; and with an image recording window which is provided on a first surface portion of the housing and which is configured for detecting an image inside the storage apparatus by the image detection element. The image recording element is configured such that an image is recorded in the storage apparatus in which the housing is installed.

SUMMARY OF THE INVENTION

It is the object of the present invention to remedy at least partially the drawbacks of the prior art and, in particular, to provide an improved identification of a door movement, in particular of a refrigerator, a camera being installed in the door thereof for recording images of a refrigerating zone.

This object is achieved according to the features of the independent claims. Advantageous embodiments form the subject matter of the dependent claims, the description and the drawings.

The object is achieved by a household appliance having at least one movable door and at least one sensor for detecting a door movement of said at least one door, wherein the at least one sensor has at least one inertial sensor integrated into the at least one door.

This household appliance has the advantage that an opening angle of the at least one door is continuously or semi-continuously determinable over the entire door movement and that not just one trigger angle is detected as, for example, in the case of Hall sensors. As a result, there is the option that appliance functions are controllable, in particular continuously, according to a plurality of values of the door opening angle.

If an appliance function is to be activated or triggered as a function of a predetermined door opening angle, this results in the further advantage that this trigger angle is adaptable in any manner without having to undertake any mechanical alterations to the appliance. This may be used advantageously, for example, for compensating for signs of use and/or mounting tolerances. Thus different camera modules, which for example may require different trigger angles due to different fields of view, may also be used in series in a simple manner or in the case of replacement by an after-sales service department by adapting the trigger angle, etc.

An inertial sensor may be understood, in particular, as a sensor which is designed to measure independently translational and/or rotational accelerations.

Since a sensor is integrated in the at least one door, this may encompass, in particular, that it has already been installed in the factory and does not constitute a component which has been added on or retrofitted.

The detection of the door movement may comprise a detection of a parameter of the door associated with a door movement. The detection of the door movement may, in particular, comprise a detection of a door opening angle of a rotatable or pivotable door and/or a detection of a door opening speed, for example an angular speed of a rotatable or pivotable door. The door opening speed may also be detected in the case of a slidable door.

The door is, in particular, a door which is pivotable against the body.

In one embodiment, at least one inertial sensor is a rotational speed sensor. This sensor is particularly suitable for determining a current opening angle of the door with a high degree of accuracy and at a low cost. In particular, the angular speed of the door may be measured by means of the rotational speed sensor and—for example by integrating the measured angular speed over time—the door opening angle may be determined therefrom.

In one development, a door opening angle is determinable from zero (which corresponds to a closed door) by switching a door switch.

In one embodiment, the rotational speed sensor is a vibrating structure gyroscope (VSG). This is particularly robust, small and cost-effective.

In one embodiment, at least one inertial sensor is an acceleration sensor. The acceleration sensor is provided, in particular, for measuring linear accelerations.

In principle, a door opening angle may also be determined by an acceleration sensor, in particular when the door is only open slightly. However, in the case of a single acceleration sensor the accuracy of the determination is significantly reduced with greater pivoting angles of the door. This may be compensated by the use of a plurality of differently oriented acceleration sensors.

A further advantageous application of an acceleration sensor is to determine a drift of a rotational speed sensor. By considering the drift, thus determined, a door opening angle determined by the rotational speed sensor may be corrected and thus determined more accurately. In particular, for this application—but in principle also for other applications—it is advantageous that at least one rotational speed sensor and at least one (linear) acceleration sensor are installed in at least one door.

In one embodiment, at least one inertial sensor is an MEMS sensor. An MEMS ("Micro-Electro-Mechanical System") sensor has the advantage that it may be directly implemented in integrated switching circuits.

As an alternative to an MEMS sensor at least one inertial sensor may be a piezo-electric sensor. This sensor may have crystal rods, for example, which are slightly bent during acceleration and slightly detune an electrical oscillating circuit.

In the case of inertial sensors, it is possible to differentiate between integrated sensors, in which an electronic evaluation circuit and a sensor core are integrated in a common chip, and discrete sensors, which consist of a separate sensor chip and an electronic evaluation chip.

In one embodiment, for the operation thereof at least one inertial sensor is connected to an energy storage device which is able to be wirelessly charged at least when the door is closed. This provides the advantage that a power supply cable to the inertial sensor may be dispensed with. The energy storage device may have, for example, at least one super-condenser. Optionally further components connected to the inertial sensor (such as an evaluation circuit) may be supplied with energy by means of the energy storage device.

Since the energy storage device is able to be wirelessly charged at least when the door is closed, this may encompass that the energy supply is no longer effective in the case of any significant opening of the door.

In one development, the energy storage device is able to be charged inductively. To this end, it may be connected to a pick-up coil in which an induction voltage may be induced by means of an inductive alternating field in order to charge the energy storage device and to operate the inertial sensor and optionally further components connected thereto (such as an evaluation circuit). For implementing this development, at least one primary coil, which is designed and arranged for generating the inductive ("charging") alternating field, may be present in the body of the household appliance. The primary coil is located opposite the pick-up coil for an effective transmission of energy when the door is closed.

In a further development, at least one inertial sensor is able to be supplied with energy by a wired connection. This has the advantage that an energy storage device may be dispensed with. To this end, a power supply cable, for example a simple two-core cable, may be passed from the body into the door.

In principle, at least one inertial sensor is able to be charged wirelessly and at least one further inertial sensor which is located in the door may be supplied with energy by a wired connection.

In one embodiment, at least one inertial sensor is connected to a wireless communication interface. As a result, a wireless communication of the inertial sensor may be made with at least one further component of the household appliance which is designed for wireless communication, for example with a central control apparatus, at least one camera, etc. This in turn provides the advantage that a data transmission cable does not have to be passed into the door or in the door.

In one embodiment, data may be transmitted by at least one inertial sensor by a wired connection, for example to a central control apparatus, at least one camera, etc.

In one development, the data transmission is carried out from the inertial sensor unidirectionally, wherein only sensor or measurement data may be emitted via the communication interface. In a further development, the data transmission is carried out bidirectionally, sensor or measurement data being emitted and control commands or other data being received via the communication interface.

In a further embodiment, the household appliance has an evaluation unit connected to at least one inertial sensor for evaluating sensor data of the at least one inertial sensor—in particular for determining a current door opening position. The evaluation unit serves, in particular, for evaluating the sensor signals or measurement data of at least one inertial sensor for determining at least one door opening angle, and optionally also further values such as a door opening speed.

In one development, the evaluation unit is programmable, which facilitates the flexible use thereof and re-adjustment of operating points such as trigger angles. Thus, for example, trigger angles may be altered, added again and/or removed. In one development, the evaluation unit has to this end a data storage device, in particular a programmable non-volatile data storage device such as an EEPROM, or the like.

At least one part of the evaluation unit may be combined with the inertial sensor in a common "integrated sensor". The evaluation unit and the inertial sensor may also be arranged on a common subassembly, for example on an electronic control unit located in the door. Additionally, the evaluation unit and the inertial sensor may be arranged so as to be distributed over the appliance, for example with the inertial sensor in the door and the evaluation unit in the body.

If the evaluation unit is combined with the inertial sensor in an integrated sensor or if the evaluation unit and the inertial sensor are arranged on a common subassembly, the evaluation unit may be connected to the energy storage device, in a similar manner to the inertial sensor, or may be able to be supplied with energy by a wired connection.

In addition, therefore, data may be transmitted by a wireless and/or wired connection from or to the evaluation unit. In particular, data of a further component of the household appliance may be exchanged only with the evaluation unit, i.e. not directly with the inertial sensor.

Generally, an evaluation unit may be connected or coupled to a plurality of inertial sensors, for example by a wireless and/or wired connection, and optionally also to inertial sensors which are arranged in different doors. The evaluation apparatus may generally be connected to further sensors (not configured as inertial sensors) which in particular may detect a position or location of the at least one door, for example with at least one door opening switch, at least one magnetometer such as a Hall sensor, etc. This may improve even further the accuracy of a determination of the location and/or door opening angle of the at least one door.

In one embodiment, the household appliance, in particular the evaluation unit, is designed to activate at least one action as a function of the door opening angle detected by the at least one inertial sensor. In particular, the evaluation unit may be designed therefor.

In one embodiment, the at least one action comprises a light control of the household appliance. Thus a generation of light may be advantageously adapted in a particularly variable manner to the current door opening angle. The light control may comprise a brightness alteration and/or a color alteration of the light generated by the household appliance. To this end, the household appliance may have at least one light generating apparatus which, for example, is able to be activated directly by the evaluation unit or via a further control apparatus (for example a central control apparatus). The light generating apparatus may have, for example, one or more LEDs.

In one development, the light control comprises a light control of the light radiated from at least one light generating apparatus into the treatment chamber. For example, the treatment chamber may be illuminated all the more brightly, the smaller the door opening angle. This is advantageous in order to unify the total brightness in the treatment chamber by taking into account incident ambient light. For example, treatment chamber may be understood in refrigeration appliances as a refrigerating zone of a refrigerator, in cooking appliances as a cooking chamber, and in washing machines as a washing chamber etc.

In one development, the light control comprises a light control of the light emitted from the household appliance into the surroundings. Thus, for example, the color of light which is radiated from control elements and/or decorative elements may be altered as a function of the door opening angle. This may be advantageous, for example, in order to communicate the door opening state to a user even more effectively.

In one embodiment, the household appliance is a refrigeration appliance, in particular a refrigeration appliance which has a refrigerator, for example a freestanding refrigerator, a combined fridge-freezer, etc.

In one development, the refrigeration appliance has at least one camera which is designed to record images of the refrigerating zone and which may also be denoted as "camera in fridge" (CiF). In this case, at least one camera may be arranged in the door.

In one development, in a CiF appliance the light control comprises a brief increase in an illumination intensity as a function of the door opening angle at the activation time of the at least one camera. Thus an improved recording brightness may be advantageously achieved. In one development, this may comprise an emission of one or more light flashes into the refrigerating zone synchronously with the activation time. In particular, the illumination intensity may be briefly increased in a targeted manner for a plurality of door opening angles.

In one embodiment, at least one camera for recording one or more images is able to be activated by means of the door opening angle determined by the at least one inertial sensor. To this end, the at least one camera may be connected directly to an evaluation unit or indirectly to a further control apparatus coupled thereto, from which it obtains corresponding control commands.

If the at least one camera is directly connected by a wired connection to an evaluation unit, the advantage is achieved that the wiring cost is particularly low. This is advantageous, in particular, in the case where both the at least one camera and also the evaluation unit are arranged in the same door.

In one embodiment, a plurality of cameras are able to be activated independently of one another based on one respective door opening angle. This provides the advantage that images may be recorded from a particularly advantageous direction or perspective. The plurality of cameras may be activated with the same and/or different door opening angles. In one development which may be implemented in a particularly simple manner, a plurality of cameras are connected directly to the same evaluation unit which is thus connected to the cameras by multiple channels. The plurality of cameras may thus be triggered independently of one another by the same evaluation unit.

In a further development, during the manufacture of a household appliance when the at least one camera is initially triggered, said camera may be assigned an individual coding which facilitates a set-up, in particular a programming, of the household appliance.

A voice control may also be implemented particularly advantageously by means of the at least one inertial sensor. For example, a voice control may be activated or deactivated as a function of an opening angle of the door.

The above-described properties, features and advantages of this invention and the manner in which they are achieved become more clear and considerably more comprehensible in connection with the following schematic description of an exemplary embodiment which is described in more detail in connection with the drawing.

BRIEF DESCRIPTION OF THE SINGLE VIEW OF THE DRAWING

The FIGURE shows in a plan view a sectional view of a household appliance according to the invention in the form of a refrigerator 1.

DETAILED DESCRIPTION OF THE INVENTION

The refrigerator 1 has a refrigerating zone 2 which on the front face has a loading opening which is able to be closed by means of a door 4 which has a door handle 5 and which is pivotable about a rotational axis 3.

An inertial sensor in the form of a vibrating structure gyroscope 6 serving as rotational speed sensor and an inertial sensor in the form of an acceleration sensor 7 are installed in the door 4. The acceleration sensor 7 is installed, in particular, at a significant distance from the rotational axis 3 in order to be subjected to comparatively high acceleration forces. The vibrating structure gyroscope 6 and the acceleration sensor 7 may be configured as MEMS sensors but are not limited thereto.

The vibrating structure gyroscope 6 and the acceleration sensor 7 are connected and/or coupled, in particular by a wired connection, to an evaluation unit 8 for evaluating sensor data of the vibrating structure gyroscope 6 and the acceleration sensor 7. The evaluation unit 8 is designed to evaluate the measurement signals of the inertial sensors 6 and 7 in order to calculate a door opening angle α and to activate at least one action as a function of the door opening angle α. A door opening angle is determinable from zero (which corresponds to a closed door) by switching a door switch 20.

This at least one action may comprise an activation of two cameras 9 which are also installed in the door 4 and which are arranged at different points on an inner face of the door 4 and which may record images of the refrigerating zone 2. In principle, just one, or more than two, cameras 9 may be present. In the case of a plurality of cameras 9 at least one camera may also be installed in the stationary body 10 of the refrigerator 1 (described above). In particular, the cameras 9 may be activated by means of the evaluation unit 8 in the case of the same and/or different door opening angles α. The cameras 9 may communicate with the evaluation unit 8 by a wireless or wired connection.

For a wireless communication the evaluation unit 8 may be generally connected to a wireless communication interface 12 or may have a wireless communication interface 12. Thus the inertial sensors 6 and 7 are also indirectly connected via the evaluation unit 8 to the wireless communication interface 12.

The wireless communication may be made with the cameras 9 and/or with further components of the refrigerator 1 (such as a central control apparatus, a screen, an image projector, a light generating device, etc. described above) and/or to external entities such as an external user interface (for example a smartphone, etc.). Thus images recorded by the cameras 9 may also be shown on a screen of the smartphone. A wired communication is alternatively or additionally possible with the further components of the refrigerator 1.

Additionally, the at least one action may comprise a light control of the refrigerator 1. This may be implemented, for example, such that an illumination intensity of light of a light generating apparatus (described above) for illuminating the refrigerating zone 2 is briefly increased at the activation time of the respective cameras 9 as a function of the door angle.

The evaluation unit 8 and also the inertial sensors 6 and 7 are connected (indirectly via the evaluation unit 8 or directly) to an energy storage device 13 such as an accumulator, a condenser, in particular a super-condenser, etc. which is able to be wirelessly charged, at least when the door 4 is closed. Thus an autonomous operation of the evaluation unit 8 and the inertial sensors 6 and 7 may be achieved even when the door is open 4, without a power cable having to be laid therefor in the door 4.

The energy storage device 13 is able to be wirelessly charged at least when the door 4 is closed. To this end, an inductive energy transmission is used, wherein a primary coil 14 is present in the body 10 and opposes at a short distance a pick-up coil 15, which is present in the door 4, when the door 4 is closed. The primary coil 14 may generate a magnetic alternating field which is tapped by the pick-up coil 15. The induction voltage thus generated in the pick-up coil 15 may be used for operating the evaluation unit 8 and the inertial sensors 6 and 7, optionally after rectification.

Naturally the present invention is not limited to the exemplary embodiments shown.

Generally "one", etc. is understood as an individual item or a plurality thereof, in particular in the sense of "at least one" or "one or more", etc. provided this is not explicitly excluded, for example by the expression "just one", etc.

Numerical data may exactly encompass the specified number and also a conventional tolerance range, provided this is not explicitly excluded.

LIST OF REFERENCE CHARACTERS

1 Refrigerator
2 Refrigerating zone
3 Door
4 Rotational axis
5 Door handle
6 Vibrating structure gyroscope
7 Acceleration sensor
8 Evaluation unit
9 Camera
10 Body
12 Wireless communication interface
13 Energy storage device
14 Primary coil
15 Pick-up coil
α Door opening angle

The invention claimed is:

1. A household appliance, comprising:
at least one movable door;
a door switch configured to be switched for determining a closed position of said at least one door;
at least one sensor for detecting a door movement of said at least one door, said at least one sensor including at least one inertial sensor integrated into said at least one door, said at least one inertial sensor including a rotational speed sensor configured to measure rotational acceleration and an acceleration sensor configured to measure translational acceleration; and
an evaluator connected to said door switch and configured to determine a door opening angle from zero of said at least one door and connected to said rotational speed sensor and to aid acceleration sensor to determine at least one of a location or said door opening angle, said evaluator configured to activate at least one action as a function of said door opening angle detected by said at least one inertial sensor, said door opening angle including trigger angles for triggering appliance functions;
said evaluator configured to adapt said trigger angles at least one of for compensating for signs of use or for compensating for mounting tolerances or for use of different replacement cameras.

2. The household appliance according to claim 1, wherein said at least one inertial sensor detects a door opening angle of said at least one door as said door movement.

3. The household appliance according to claim 1, wherein said rotational speed sensor is a vibrating structure gyroscope.

4. The household appliance according to claim 1, wherein said at least one inertial sensor is a MEMS sensor.

5. The household appliance according to claim 1, which further comprises an energy store configured to be charged at least when said at least one door is closed, said at least one inertial sensor being connected to said energy store, a primary coil disposed in an appliance body for generating a magnetic alternating field, and a pick-up coil disposed in said door opposite said primary coil when said door is closed for tapping the magnetic alternating filed and generating an induction voltage charging said energy store.

6. The household appliance according to claim 1, which further comprises a wireless communication interface, said at least one inertial sensor being connected to said wireless communication interface.

7. The household appliance according to claim 1, wherein said evaluator is connected to said at least one inertial sensor for evaluating sensor data of said at least one inertial sensor.

8. The household appliance according to claim 7, wherein said evaluator is configured to activate at least one action as a function of said door opening angle detected by said at least one inertial sensor.

9. The household appliance according to claim 8, wherein said at least one action includes a light control of the household appliance.

10. The household appliance according to claim 2, wherein:
the household appliance is a refrigeration appliance having a refrigerator with a refrigerating zone;
at least one camera is configured to record images of said refrigerating zone; and
said at least one camera is configured to be activated for recording one or more images upon reaching said door opening angle determined by said at least one inertial sensor.

11. The household appliance according to claim 10, wherein said at least one camera includes a plurality of cameras each configured to be activated independently of one another based on a respective door opening angle determined by said at least one inertial sensor.

12. The household appliance according to claim 10, wherein:
said evaluator is connected to said at least one inertial sensor for evaluating sensor data of said at least one inertial sensor;
said evaluator being configured to activate at least one action as a function of said door opening angle detected by said at least one inertial sensor; and
said at least one action including a light control of the household appliance;
said light control providing a brief increase in an illumination intensity as a function of said door opening angle at an activation time of said at least one camera.

13. A household refrigeration appliance, comprising:
at least one movable door;
at least one sensor for detecting a door movement of said at least one door;
said at least one sensor including at least one inertial sensor integrated into said at least one door, said at least one inertial sensor detecting a door opening angle of said at least one door as said door movement, said door opening angle including trigger angles for triggering appliance functions;
a refrigerator of the household refrigeration appliance having a refrigerating zone;
at least one camera configured to record images of said refrigerating zone, said at least one camera configured to be activated for recording one or more images upon reaching said door opening angle detected by said at least one inertial sensor; and
an evaluator connected to said at least one inertial sensor for evaluating sensor data of said at least one inertial sensor, said evaluator configured to activate at least one action as a function of said door opening angle detected by said at least one inertial sensor, said at least one action including a light control of the household appliance, and said light control providing a brief increase in an illumination intensity as a function of said door opening angle at an activation time of said at least one camera;
said evaluator configured to adapt said trigger angles at least one of for compensating for signs of use or for compensating for mounting tolerances or for use of different replacement cameras.

14. The household appliance according to claim 1, wherein said evaluator continuously or semi-continuously determines said door opening angle.

* * * * *